United States Patent [19]

Biberian

[11] Patent Number: 4,763,187

[45] Date of Patent: Aug. 9, 1988

[54] METHOD OF FORMING IMAGES ON A FLAT VIDEO SCREEN

[75] Inventor: Jean P. Biberian, Marseilles, France

[73] Assignee: Laboratoire d'Etude Des Surfaces, Marseilles, France

[21] Appl. No.: 709,671

[22] Filed: Mar. 8, 1985

[30] Foreign Application Priority Data

Mar. 9, 1984 [FR] France ................................ 84 03877

[51] Int. Cl.[4] ................................................ H04N 9/12

[52] U.S. Cl. ....................................... 358/56; 340/752; 340/775; 340/766; 313/309; 358/230

[58] Field of Search ........................ 340/752, 766, 775; 358/56, 59, 230; 313/495, 422, 500, 301, 302, 304, 309; 315/169.1, 169.2, 167, 168

[56] References Cited

U.S. PATENT DOCUMENTS

| | | | |
|---|---|---|---|
| 3,935,499 | 1/1976 | Oess | 313/495 |
| 3,935,500 | 1/1976 | Oess et al. | 313/302 |
| 4,020,381 | 4/1977 | Oess et al. | 313/304 |
| 4,170,772 | 10/1979 | Bly | 358/59 |
| 4,486,749 | 12/1984 | Kishino et al. | 340/752 |

*Primary Examiner*—Tommy P. Chin
*Assistant Examiner*—Robert M. Bauer
*Attorney, Agent, or Firm*—Browdy and Neimark

[57] ABSTRACT

A device and method for formation of images with flat video screens by a line- and column-addressed point matrix. Field point matrix uses field emission micro tips as fluorescent screen portions being connected in columns. An electric field is applied between each tip and the fluorescent screen portion corresponding thereto, such that the respective tip emits electrons and a light spot is formed on the video screen, the intensity of which depends upon the applied voltage for attracting electrons. Emission from other tips is blocked by applying a negative voltage to the other columns. Thus, by successive switchings, successive luminous spots are formed on the video screen as desired.

9 Claims, 3 Drawing Sheets

METHOD OF FORMING IMAGES ON A FLAT VIDEO SCREEN

BACKGROUND OF THE INVENTION

It is known that various techniques have been proposed in the field of flat video screens. The ideal system should be capable of generating screens of both small and large dimensions, of being compatible both for black and white as well as for color, of having small electric consumption and of being simple of manufacture.

The conventional television tube with electron beam scanning cannot be reduced in thickness for physical reasons, i.e. image distortion if the beam falls at a low angle onto the screen and lack of precision for reaching the mask on a screen in case of color. Furthermore, the screen dimensions cannot be significantly increased due to vacuum requirements, in other words relating to strength of the materials under pressure.

Therefore, the tendency is to form images not with a scanned beam but by a line and column addressed matrix of points(spots).

In this field of art, liquid crystals are attractive since they require very little electric consumption of power, but on the other hand, to be visible they require an external light source. Moreover, it is very difficult to obtain gradations in grey levels and to produce color images.

Other methods have been proposed for the realization of flat screens. One of them uses a plasma microdischarge in a gas as an electron source, such electrons being thereafter attracted toward a fluorescent screen. Line and column addressing permits illumination of the desired spot on the screen. Unfortunately, utilization of a plasma as the electron source is delicate, since the plasma either occurs or does not occur, i.e. the spot is either illuminated or extinguished. The result is that grey levels cannot be obtained.

SUMMARY OF THE INVENTION

This invention relates to a method of operation of flat video screens of the type in which image formation is obtained by a line-and column addressed point matrix, characterized in that it involves:

using field emission microtips as electron sources, the tips being connected in lines on the one hand, and on the other hand, the fluorescent screens being connected in columns, applying successively an electric field between each of the tips and the screens corresponding thereto, such that the respective tip emits electrons and forms a luminous spot on the screen, the intensity of which depends on the applied voltage for extracting electrons from the tip, and simultaneously blocking emission from any other tips by applying a negative voltage to the other columns not involved in the electron emission, and so on, by successive switchings so as to display formation in the successive luminous spots on the screen corresponding to the matrix.

The invention also relates to the flat video screens operating as above.

Other characteristics and advantages and features of this invention will appear from the following description with reference to the attached, very schematic, drawings representing various possible forms of embodiment of the invention.

DESCRIPTION OF PREFERRED EMBODIMENTS

Figure 1:
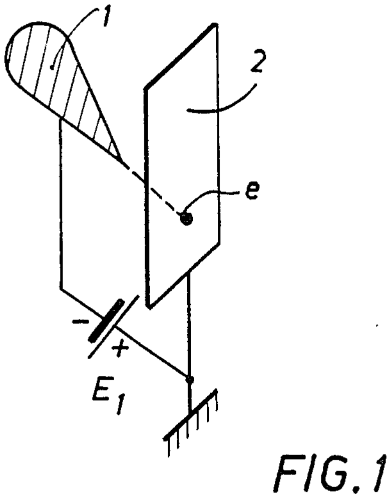
FIG. 1 is a diagrammatic view indicating the basic principle of the invention.

The basic principle of the invention as schematized in FIG. 1 substantially consists of using field emission microtips as the electron sources. A field emission tip such as at 1 of a radius of curvature of a few hundreds of Ångströms emits electrons e simply by applying an electric field between point 1 and a fluorescent screen 2 by means of potential $E_1$.

Figure 2:
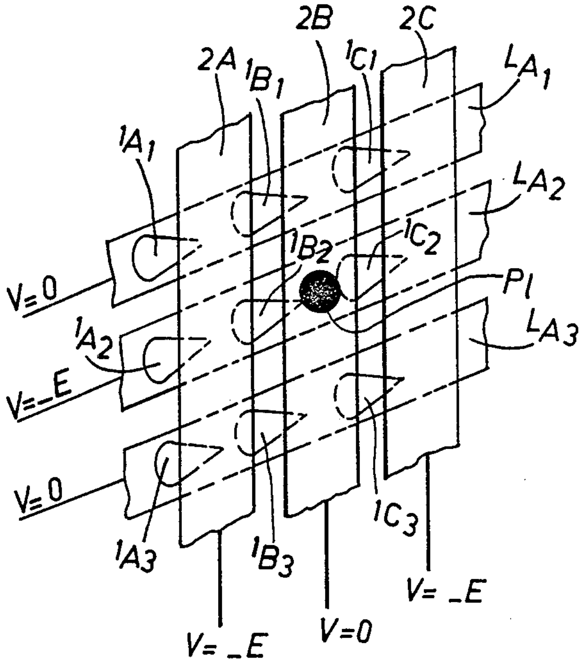
FIG. 2 is an explanatory diagram of a first embodiment having a flat video screen for carrying out the basic principle of FIG. 1 with a diode type circuit arrangement.

A simple means for providing a flat video screen according to the invention involves, as is shown schematically FIG. 2, in connecting the tips in lines, for example the tips $1_{A1}$, $1_{B1}$, $1_{C1}$ . . . according to line $L_{A1}$; tips $1_{A2}$, $1_{B2}$, $1_{C2}$ . . . according to line $L_{A2}$; tips $1_{A3}$, $1_{B3}$, $1_{C3}$ . . . according to line $L_{A3}$, and so on, on the one hand, and on the other hand, the screens in columns $2_A$, $2_B$, $2_C$ . . . . This arrangement permits successive light spots to be emitted onto the screen by a line-and column which is line-and column addressed.

The tips can be realized by deposition or engraving methods using the conventional micro-electronic methods, i.e. masking, then moist engraving in acid baths, or dry engraving by plasma, or by a particle beam.

The different columns on the screen are formed of a by transparent material, for example, glass, covered with a metallic film or a fluorescent material. For example when line $L_{A2}$ and column $2_B$ are addressed with suitable potentials, electron emission occurs from point $1_{B2}$ and a light point $P_1$ is formed on the screen. The intensity of the light depends on the voltage $V=-E$ applied to line $L_{A2}$, the radius of curvature of the tip $1_B$ and the spacing between the tip and the screen, it being understood that these last two parameters are constant for all of the tips.

It can be seen immediately that to prevent electron the emission from tips of line $L_{A2}$ other than those located in column $2_B$, i.e. points $1_{A2}$, $1_{C2}$ tips, there should be applied a negative potential ($V=-E$) to the other screen columns $2_A$, $2_C$ . . . , the potential being zero ($V=0$) on the considered column $2_B$.

Similarly, to prevent those tips located in column $2_B$ other than those of line $L_{A2}$, i.e. points $1_{B1}$, $1_{B3}$ . . . , for emitting electrons, a potential of zero ($V=0$), should be applied to the other lines $L_{A1}$, $L_{A3}$, . . . , wherein the potential applied to line $L_{A2}$ is negative, ($V=-E$).

In this way, only the diode constituted by point $1_{B2}$ in line $L_{A2}$ and the screen in column $2_B$ is in the conductive state, with all other diodes being blocked.

Since the radius of curvature of each tip and the spacing between the tip and the screen area constant values to be fixed by construction, thus the light intensity of each spot of light is a function of the applied voltage E.

Thus, one can realize the formation of images on the screen by a line and column addressed point matrix.

In order to avoid the problem of how to manufacture of a great number of microtips of very similar radii of curvature, and also to remedy any defects in any of these points, it is advantageous to realize each light spot by plurality of several microtips. Each microtip can have a width at the base of approximately, and 1 $\mu$m, and it is therefore possible to dispose up to about 100 of such points per each elementary light spot, thereby providing statistical uniformity in the light intensity all over the screen surface.

In order to produce color, it is sufficient, apart from useless technical details, to triple the lines or columns and to place fluorescent materials of differing colors, for example red, green and blue, arranged in triads on the screen opposite each elementary light spot.

A type of screen configuration according to the invention as immediately above described is of the diode type, and constitutes a simple solution as regards design, but problems occur relative to control voltages. As a matter of fact, in order for the voltage E for extracting electrons to be sufficiently low to permit quick switching, the point and screen spacing must be on the order of a few microns, thereby obviously raising technical problems of manufacturing.

Figure 3:
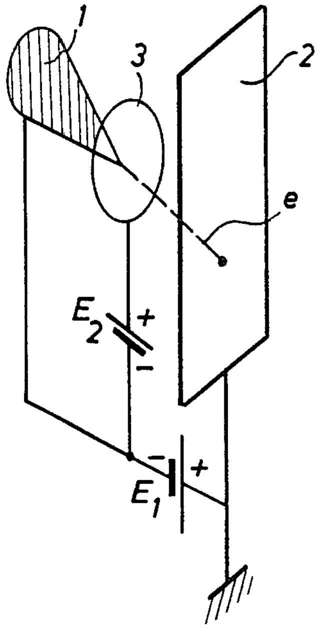
FIG. 3 indicates a more complicated variation of the basic principle of the invention, having a triode-type circuit arrangement.

A solution with great advantages according to this invention, that facilitates quick switching and permits significant to reduction of the technical problems mentioned above, is illustrated schematically in FIG. 3.

This solution involves using a triode type circuit with a control grid 3 which permits modulation of the electron emission intensity. By varying the voltage $E_2$, the number of emitted electrons is modified, and by varying voltage $E_1$ the energy of the electrons e reaching the light screen 2 is varied.

In the case of the triode circuit arrangement, the matrixing is similar to that of the diode circuit arrangement, it being however significant to note that contrary to the latter, three combinations of applied voltages are possible, namely,:

1. tip 1-grid 3, the third component, in this case the screen 2, being set to a fixed potential,
2. tip 1-screen 2, the third component, in this case grid 3, being set to a fixed potential,
3. grid 3-screen 2, the third component, in this case tip 1, being set to a fixed potential.

Figure 4:
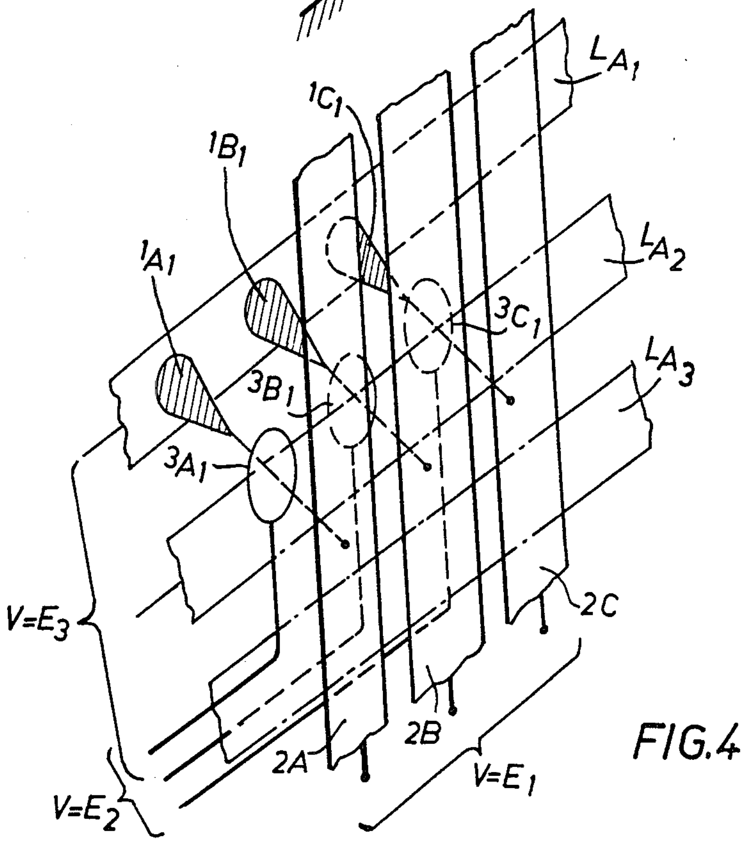
FIG. 4 indicates of a modified embodiment of a flat video screen to carry out the principle illustrated in FIG. 3.

As can be seen from the diagram of FIG. 4 (which is analogous to that of FIG. 2, but wherein only tips $\mathbf{1}_{A1}$, $\mathbf{1}_{B1}$, $\mathbf{1}_{C1}$ . . . and the corresponding grids $\mathbf{3}_{A1}$, $\mathbf{3}_{B1}$, $\mathbf{3}_{C1}$ . . . have been shown for clarity of the drawing), one can also use in the case of a triode type circuit arrangement, a solution with three components by effecting a line-and column-addressing for the tips and the opposing fluorescent screens, however without modulation of the values of the applied voltages $E_1$ and $E_3$, by connecting all grids $\mathbf{3}_{A1}$, $\mathbf{3}_{B1}$, $\mathbf{3}_{C1}$ . . . together, and modulating the common voltage $E_2$ for varying the light intensity.

In the same manner, a line and column addressing can be realized by providing the grid and the screen with fixed voltages $E_2$ and $E_1$, respectively and by connect all tips together to vary the light intensity by modulating the common voltage $E_3$.

A line-and column-addressing can also be effected between the tip and grid with fixed voltages $E_3$ and $E_2$ and all the screens can be connected together to vary the light intensity by modulating the common screen voltage $E_1$.

It can be seen that this three-component method permits separation of the addressing and intensity modulation functions.

Clearly, with this triode type circuit arrangement, color can be realized as in the case of the diode type circuit arrangement by tripling the lines and columns and providing fluorescent materials of differing colors on the screen.

For reasons of fabrication both of the screen and the points it appears to be suitable to connect all tips together and all screens together, since otherwise difficulties result from the manufacturing of tips on an insulating carrier which separates the columns or lines of tips.

Figure 5:
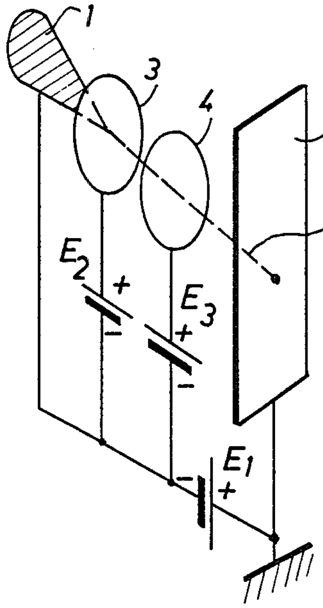
FIG. 5 is a diagrammatic view of a further embodiment of the basic principle of the invention, having a tetrode type circuit arrangement.
Figure 6:
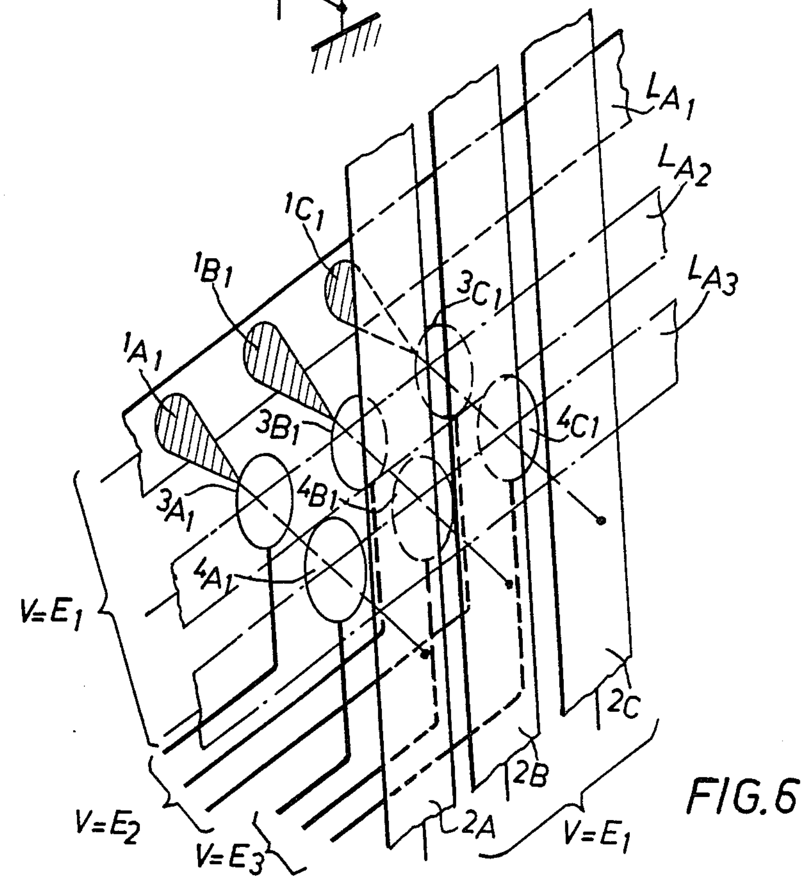
FIG. 6 is an explanatory diagrammatic view of an embodiment of a flat video screen for carrying out the principle illustrated in FIG. 5.

According to the invention, the above problem can be solved in a simple and efficient manner by adopting the tetrode type circuit arrangement shown schematically in FIGS. 5 and 6.

This circuit arrangement comprises, as in the preceding cases and for each unit light spot, a field emission tip 1, a fluorescent screen 2, a first extraction grid 3, and a second extraction grid 4.

As can be seen from the diagram of FIG. 6, which is analogous to that of FIG. 4, all tips $\mathbf{1}_{A1}$, $\mathbf{1}_{B1}$, $\mathbf{1}_{C1}$ . . . all connected together as well as screens $\mathbf{2}_A$, $\mathbf{2}_B$, $\mathbf{2}_C$ . . . .

It results that due to this tetrode circuit arrangement, the line and column addressing is effected by modifying voltages $E_2$ and $E_3$, whereas modulation of the light intensity is obtained by varying voltage $E_1$.

Obviously, with this tetrode circuit arrangement, color can be realized as in the preceding cases by tripling the lines and columns and placing fluorescent materials of differing colors on the screen.

It will be understood that this invention was only described and represented in a purely explanatory and not at all limitative manner and that any technical equivalent can be substituted for its constituents without departing from its scope.

It is to be noted in particular that the line and column matrixing and addressing constituting two of the phases of the inventive method are well known operations for the man of the art, and that their detailed modes of embodiment can be selected from those most currently used.

I claim:

1. A method of forming images on a flat video screen by a line- and column-addressed point matrix using field emission tips as electron sources, said tips being connected in respective lines, and respective fluorescent screen portions for said tips being connected in columns, said method comprising applying successively an electric field between each of said tips and the respective fluorescent screen portion such that the respective tip emits electrons and forms on said flat video screen a respective light spot, the intensity of which depends upon the applied electric field for attracting electrons, while simultaneously blocking emission from others of said tips by applying a negative voltage to the columns other than the column in which the electron emission from the respective tip is occurring, and successively switching the addressed line and column to selectively form on the flat video screen successive luminous spots corresponding to the matrix, wherein both the intensity of the emitted electrons from the respective tip and the energy of the electrons reaching the respective fluorescent screen portions are modulated by separating the addressing and the light intensity modulation functions by means of at least a first grid between each respective tip and fluorescent screen portion, and by applying an addressing voltage to two of the respective tip, grid and fluorescent screen portion and a modulation voltage to the third one thereof.

2. The method of claim 1, wherein, for said separating of the addressing and light intensity modulation functions, a line- and column-addressing is effected for the respective grids and fluorescent screen portions without modulation of the values of the voltages applied thereto, and all of said tips are connected together and the voltage applied thereto is modulated for varying of the light intensity.

3. The method of claim 1, wherein for said separating of the addressing and light intensity modulation functions, a line and column addressing is effected for the respective tips and grids without modulation of the values of voltages applied thereto, and all of said fluorescent columns screens are connected together and the voltage applied thereto is modulated for varying of the light intensity.

4. The method of claim 1, wherein, between each said tip and the corresponding fluorescent screen portion, said first grid is incorporated as a first electron extraction grid and a second grid is provided as a second extraction grid for said electrons, and all of said tips are connected together and all of said fluorescent screen columns are connected together, said method comprising performing the line- and column-addressing by modifying the voltages applied to the first and second extraction grids respectively, and performing said light intensity variation by modulating the voltage applied between the respective lines of said tips and fluorescent screen portions.

5. A flat video screen operated according to the method as specified in claim 1.

6. The flat video screen of claim 5, comprising a single one of said tips for each said light spot of said flat video screen.

7. The flat video screen of claim 1, comprising a plurality of said tips corresponding to each point of said matrix and to each respective light spot on said flat video screen, the tips in each said plurality being connected in common for each said line.

8. The flat video screen of claim 7, wherein three colors are displayed, comprising a respective plurality of said tips for each said spot of said flat video screen and a respective one of said lines for each said color.

9. A video device comprising a plurality of lines having spaced on each said line, tips for electron emission, a plurality of fluorescent screens arranged in columns aligned at an angle to said lines and adjacent said tips to define display spots at points where said lines and columns cross, and a first grid located between adjacent crossing points of the lines and columns, and means for selectively addressing each said spot for selectively causing electron emission from each selected tip in sequence while controlling the amplitudes of the relative voltage of at least one of the respective line, grid and column during said addressing to modulate the intensity of said spots.

* * * * *

US004763187B1

REEXAMINATION CERTIFICATE (3368th)

United States Patent [19] [11] B1 4,763,187

Biberian [45] Certificate Issued Nov. 4, 1997

[54] METHOD OF FORMING IMAGES ON A FLAT VIDEO SCREEN

[75] Inventor: Jean P. Biberian, Marseilles, France

[73] Assignee: Laboratoire d'Etude des Surfaces, Marseille Cedex, France

Reexamination Request:
No. 90/003,722, Feb. 13, 1995

Reexamination Certificate for:

| | |
|---|---|
| Patent No.: | **4,763,187** |
| Issued: | **Aug. 9, 1988** |
| Appl. No.: | **709,671** |
| Filed: | **Mar. 8, 1985** |

[30] Foreign Application Priority Data

Mar. 9, 1984 [FR] France .................................. 84 03877

[51] Int. Cl.$^6$ ...................................................... H04N 9/12

[52] U.S. Cl. ........................... 348/796; 313/309; 345/75; 348/800

[58] Field of Search .................................... 348/209, 210, 348/796; 345/75; 313/309, 336, 351

[56] References Cited

U.S. PATENT DOCUMENTS

| | | | |
|---|---|---|---|
| 2,348,561 | 6/1944 | Mutch | 313/309 |
| 2,774,813 | 12/1956 | Livingston . | |
| 3,500,102 | 3/1970 | Crost et al. . | |
| 3,622,828 | 11/1971 | Zinn . | |
| 3,624,273 | 11/1971 | Gale . | |
| 3,755,704 | 8/1973 | Spindt et al. | 313/309 |
| 3,855,499 | 12/1974 | Yamada et al. | 345/75 |
| 3,921,022 | 11/1975 | Levine . | |
| 3,935,499 | 1/1976 | Oess . | |
| 3,935,500 | 1/1976 | Oess et al. . | |
| 3,998,678 | 12/1976 | Fukase et al. | 216/11 |
| 4,020,381 | 4/1977 | Oess et al. . | |
| 4,170,772 | 10/1979 | Bly . | |
| 4,178,531 | 12/1979 | Alig | 313/409 |
| 4,486,749 | 12/1984 | Kishino et al. . | |
| 4,513,308 | 4/1985 | Greene et al. | 251/77 |
| 4,575,765 | 3/1986 | Hirt | 348/800 |

OTHER PUBLICATIONS

Sobel Article, IEEE Conf. Record of 1970, IEEE Conf. on Display Devices, pp. 74–84.

*Primary Examiner*—Glenton B. Burgess

[57] ABSTRACT

A device and method for formation of images with flat video screens by a line- and column-addressed point matrix. Field point matrix uses field emission micro tips as fluorescent screen portions being connected in columns. An electric field is applied between each tip and the fluorescent screen portion corresponding thereto, such that the respective tip emits electrons and a light spot is formed on the video screen, the intensity of which depends upon the applied voltage for attracting electrons. Emission from other tips is blocked by applying a negative voltage to the other columns. Thus, by successive switchings, successive luminous spots are formed on the video screen as desired.

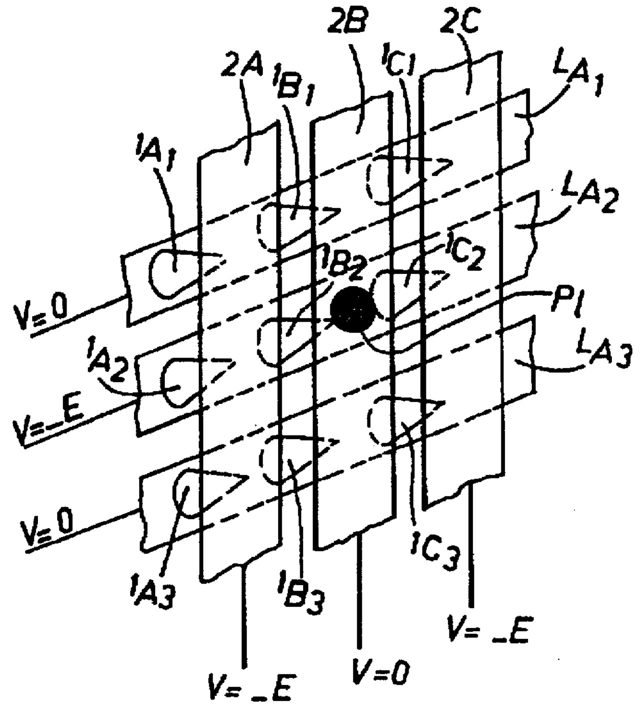

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–9 is confirmed.

New claims 10–17 are added and determined to be patentable.

*10. A video device according to claim 9 in the form of a flat video screen.*

*11. The flat video screen of claim 10, comprising a single one of said tips for each said light spot of said flat video screen.*

*12. The flat video screen of claim 10, comprising a plurality of said tips corresponding to each point of said matrix and to each respective light spot on said flat video screen, the tips in each said plurality being connected in common for each said line.*

*13. The flat video screen of claim 12, wherein three colors are displayed, comprising a respective plurality of said tips for each said spot of said flat video screen and a respective one of said lines for each said color.*

*14. The flat video screen of claim 10, wherein three colors are displayed, comprising a respective plurality of said tips for each said spot of said flat video screen and a respective one of said lines for each said color.*

*15. A video device comprising:*

*a plurality of lines, having spaced on each said line, tips for electron emission,*

*a plurality of fluorescent screens arranged in columns aligned at an angle to said lines and adjacent said tips to define display spots at points where said lines and columns cross, a capacitance being formed between each fluorescent screen and corresponding tip,*

*a first grid located between adjacent crossing points of the lines and columns,*

*means for selectively addressing each said spot for selectively causing electron emission from each selected tip in sequence, while controlling the amplitude of the relative voltage of at least one of the respective lines, grids and columns, during said addressing to modulate the intensity of said spots, and*

*a circuit comprising at least a voltage source linking each fluorescent screen to the corresponding tip and enabling discharge of said capacitance.*

*16. A method of forming images on a flat video screen by a line and column addressed point matrix using field emission tips as electron sources, corresponding fluorescent screen portions, and at least a first grid located between each respective tip and fluorescent screen portion, a line and column addressing being effected for the respective tips and fluorescent screen portions, a capacitance being formed between each tip and corresponding fluorescent screen portion and a circuit comprising at least a voltage source linking said each tip to said corresponding fluorescent screen portion, said method comprising:*

*applying successively an electric field between each of said tips and the respective fluorescent screen portions such that the respective tip emits electrons and forms on said flat video screen a perspective light spot, the intensity of which depends upon the applied electric field for attracting electrons,*

*while simultaneously blocking emission from others of said tips by applying a negative voltage to the columns other than the column in which the electron emission from the respective tip occurs, thereby forcing the capacitance corresponding to each of the blocked tips to be discharged through said circuit,*

*and successively switching the addressed line and column to selectively form on the flat video screen successive luminous spots corresponding to the matrix,*

*wherein both the intensity of the emitted electrons from the respective tip and the energy of the electrons reaching the respective fluorescent screen portion are modulated by separating the addressing and the light intensity modulation functions by means of said grid by applying and addressing voltage to each tip, and corresponding fluorescent screen portion, and a modulation voltage to said first grid located between the addressed tip and screen, to adjust said light intensity.*

*17. A method of forming images on a flat video screen by a line and column addressed point matrix using field emission tips as electron sources, corresponding fluorescent screen portions, and at least a first grid located between each respective tip and fluorescent screen portion, a line and column addressing being effected for the respective grids and fluorescent screen portions, a capacitance being formed between each first grid and corresponding fluorescent screen portion and a circuit comprising at least a voltage source linking said each first grid to said corresponding fluorescent screen portion, said method comprising:*

*applying successively an electric field between each of said tips and the respective fluorescent screen portions such that the respective tip emits electrons and forms on said flat video screen a respective light spot, the intensity of which depends upon the applied electric field for attracting electrons,*

*while simultaneously blocking emission from others of said tips by applying a negative voltage to the columns other than the column in which the electron emission from the respective tip occurs, thereby forcing the capacitance corresponding to each first grid corresponding to a blocked tip to be discharged through said circuit,*

*and successively switching the addressed line and column to selectively form on the flat video screen successive luminous spots corresponding to the matrix,*

*wherein both the intensity of the emitted electrons from the respective tip and the energy of the electrons reaching the respective fluorescent screen portion are modulated by separating the addressing and the light intensity modulation functions by means of said grid by applying an addressing voltage to each first grid, and corresponding fluorescent screen portion, and a modulation voltage to the tip corresponding to the addressed grid and screen portion, to adjust said light intensity.*

* * * * *